Jan. 14, 1936.  J. C. HEWITT, JR., ET AL  2,027,642
PHOTOGRAPHIC PLATE AND APPARATUS FOR LOADING THE SAME
Filed Feb. 23, 1935
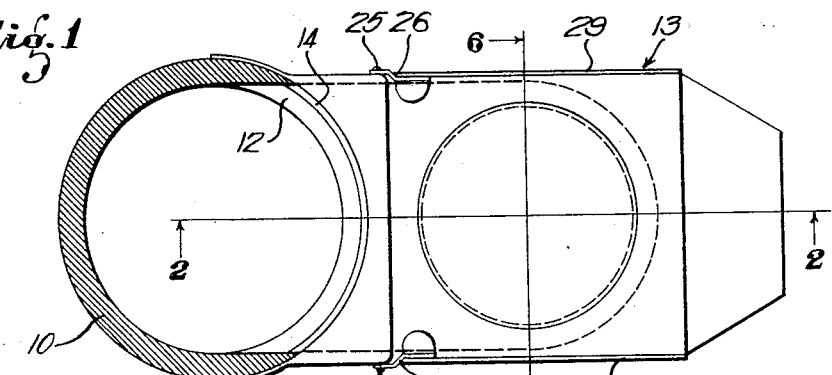
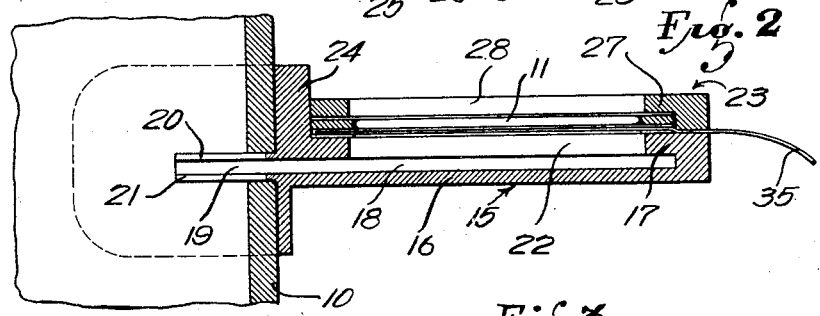
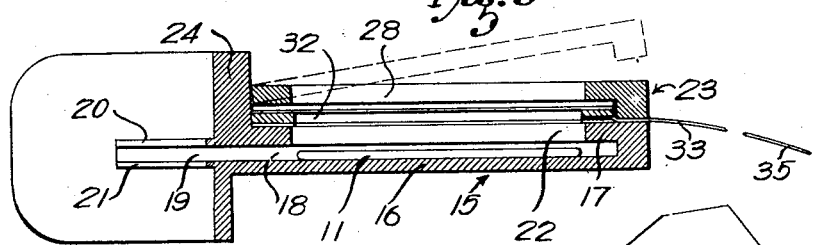
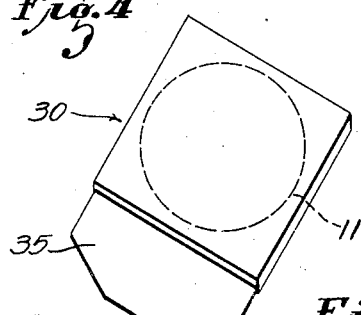
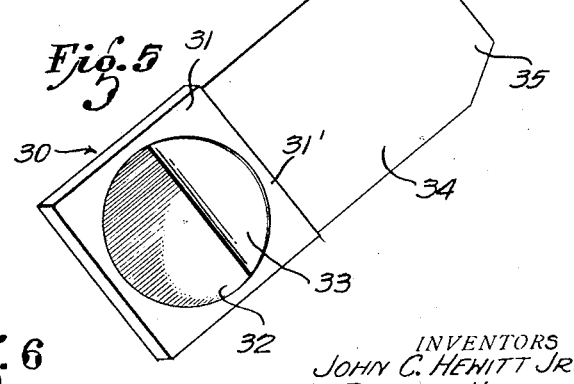
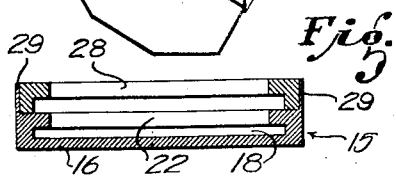
INVENTORS
JOHN C. HEWITT JR.
V. EDWARD KUSTER
BY James M. Abbett
ATTORNEY Patented Jan. 14, 1936

2,027,642

UNITED STATES PATENT OFFICE 2,027,642

PHOTOGRAPHIC PLATE AND APPARATUS FOR LOADING THE SAME

John C. Hewitt, Jr., and Vivian Edward Kuster, Long Beach, Calif., assignors to Hewitt-Kuster Company, Long Beach, Calif., a co-partnership Application February 23, 1935, Serial No. 7,818

11 Claims. (Cl. 95—72)

This invention relates to a photographic plate and apparatus for loading the same into a camera.

In the operation of photographic apparatus it is desirable to provide simple means whereby a plate may be inserted within the camera without removing the camera to a dark room while it is being loaded. This is particularly desirable in such structures as oil well surveying apparatus, such as shown in the co-pending application entitled Declination indicator for wells, Serial No. 645,600, filed by John C. Hewitt, Jr., one of the applicants herein, December 3, 1932, and in which structure a photographic disc is inserted to record the declination assumed by the instrument in well surveying. It is the principal object of the present invention to provide a loading device adapted to be disposed in a loading position relative to a plate holder of a camera, or like photographic structure, and also to provide a plate carrier which when installed within the loading device will make it possible for the photographic disc to be released from the carrier and introduced into the camera without possibility of leakage of a light which would tend to make a pre-exposure of the disc.

The invention contemplates the use of a photographic plate or disc which is normally enveloped within a light-proof carrier and which disc and carrier may be inserted into a loading device adapted to be disposed in loading relation to a photographic structure, said carrier then being capable of operation to release the photographic plate or disc into the loading structure from which it will be introduced directly into the plate holder of the camera.

The invention is illustrated by way of example in the accompanying drawing in which:

Figure 1 is a view in plan showing the loading device as applied to the magazine of a camera, which magazine is indicated in transverse section.

Fig. 2 is a view in longitudinal vertical section through the loading device showing the plate carrier and the plate in position, and further indicating the cover of the loading device by dotted lines in an open position.

Fig. 3 is a view similar to Fig. 2, showing the carrier in a releasing position with relation to the plate.

Fig. 4 is a view in perspective showing the plate carrier in its closed position.

Fig. 5 is a view in perspective showing the carrier in its unfolding and discharging condition.

Fig. 6 is a view in transverse section through the loading device as seen on the line 6—6 of Fig. 1.

Referring more particularly to the drawing, 10 indicates a magazine unit of a camera, or the like, which magazine is here shown in Fig. 1 as being circular in section, and of tubular form to receive a photographic plate or disc 11. For the purposes of use in a declination indicator this disc is circular and flat, and is provided with a coating of photographic emulsion on one or both of its sides for use in taking photographic exposures. The magazine 10 is provided with a transverse slot 12 for the purpose of receiving the photographic plate 11 and for permitting it to pass from a loading device 13. The loading device comprises a substantially semi-circular saddle 14 which is made to conform to the contour of that portion of the magazine 10 through which the plate opening 12 occurs. Extending laterally from the saddle 14 is a base portion 15 having a floor 16 and a parallel upper wall 17. The floor 16 and the wall 17 are spaced from each other to form a passageway 18 which leads to a slotted opening 19 occurring in the saddle 14 and communicating with slotted opening 12 of the magazine 10. The opposite sides of the slotted opening 19 are bounded by parallel lips 20 and 21 which project from the inner arcuate face of the saddle 14 and extend into the slot 12 of the magazine 10, it being understood that the arcuate length of the lips 20 and 21 substantially agree with the arcuate length of the slotted opening 12, and that the width of the slotted opening 12 is such that the lips 20 and 21 will fit firmly into the slotted opening and provide a light seal between the opening 12 and the opening 19 so that the photographic member will not be exposed to light as it passes through the wall of the magazine 10 and thereinto. The upper wall member 17 is formed with a central circular opening 22 therethrough which is slightly larger in diameter than the photographic disc 11 so that the disc may move downwardly through the opening 22 and into the passageway 18. Disposed above the base portion 15 is a cover 23 which is here shown as being pivoted to an upper extension 24 of the base plate by pivot pins 25 passing through ears 26 and spanning the upper base plate portion 24. The cover 23 might be slidably or removably mounted if desired. The hinged cover 23 is formed with a recessed portion 27 in its under face and a central circular opening 28 through its body to communicate with said recessed portion. It will be understood that the passageway 18 is closed on its opposite sides and at its outer end.

It is also to be pointed out that extending upwardly from the body member 15 are side flanges 29 between which the hinged cover 23 seats when the cover is in its closed position. This provides a further light seal. The loading structure is adapted to receive the plate carrier 30, shown particularly in Figs. 4 and 5 of the drawing. By reference to Fig. 5 it will be seen that this carrier comprises a frame member 31 having a central recess 32 therein. This recess is of a configuration to receive the photographic plate 11 and since the plate is here shown as circular, the recess 32 is circular. The depth of the recess 32 is sufficient to accommodate the thickness of the plate 11. Attached to the frame member 31 is a sealing flap which comprises two folding portions 33 and 34 which are folded upon each other, and in turn fold down over the frame 31 and within a cover piece 31' to close and seal the recess 32. The flap portion 34 is formed with an extension 35 which, as shown in Fig. 2 of the drawing, projects outwardly beyond the meeting faces of the members 15 and 23 so that the flaps may be drawn outwardly from their folded positions to release the photographic plate 11.

In the operation of the invention the photographic plate is positioned within the recess 32 of the frame 31 under conditions where exposure will not take place, and the flap portions 33 and 34 are folded and inserted beneath the cover piece 31' to cover the frame 31 and the photographic plate 11 seated in the recess thereof. It is to be understood that the flap portions are here shown as made of paper or other flexible material which is opaque, but that if desired other closing means might be provided, such as an opaque plate or slide. The carrier with the film therein is then in the position shown in Fig. 4 of the drawing. The loading device 13 is then grasped in one hand with its cover 23 raised, or otherwise removed, after which the carrier with the film is positioned between the side flanges 29 while resting upon the upper face of the wall 17 and the body member 15. The cover 23 is then folded downwardly to the position shown in solid lines of Figs 2 and 3 of the drawing. The fingers of the hand of the operator may be placed upon the portion of the carrier which is disclosed through the opening 28 in the hinged cover to position the same. When the hinged cover is folded downwardly the carrier will be positioned within the recess formed in the hinged cover and which is bounded at its outer edge by a flange 36. This flange cooperates with the side flanges 29 to seal the carrier completely within the loading device. In this assembled relation of the loading device 13 and the carrier 30, the loading device may be placed with its saddle 14 in a position partially embracing and abutting against the side face of the magazine 10 and with the lips 20 and 21 inserted into the slotted opening 12 of the magazine. The hinged cover 23 may be yieldably held by the hand while the end flap 35 of the carrier is drawn outwardly from between the upper face of the wall 17 and the lip 36 of the hinged cover. At such a time the lip 36 will prevent the frame 31 from being drawn outwardly while allowing the flap portions 33 and 34 to be pulled from their folded position, as shown in Fig. 2 of the drawing, to the position shown in Fig. 3 of the drawing, at which time these flaps will move from an obstructing position beneath the recess 32 of the frame 31, and from between the frame 31 and the cover piece 31'. By reference to Fig. 3 of the drawing it will be seen that when this has been accomplished the photographic plate or disc 11 will be free to fall from the recess 32, which is in register with the opening 22, through the upper wall 17 of the body member 15. The photographic plate will then fall on to the floor portion 16 and will be within the slotted passageway 18. By inclining the film magazine 10 and the loading device so that the film magazine will be lowermost it will be evident that the photographic plate will slide longitudinally of the passageway 18 and through the slotted opening 19 and the slotted opening 12 of the magazine into the magazine 10. Mechanism within the magazine will cause the plate to be moved to a position of photographic exposure, but will hold the photographic plate in a manner so that it will not be exposed to light passing through the slot 12. The structure of this mechanism is not a part of the present invention.

It will thus be seen that by the structure here disclosed convenient means are provided for temporarily enveloping and carrying a photographic plate to a point to where it is to be used, and that additional means are provided for readily removing the photographic plate from the carrier and easily loading the same into the magazine of a suitable piece of photographic apparatus.

While we have shown the preferred form of our invention, as now known to us, it will be understood that various changes might be made in the combination, construction and arrangement of parts, by those skilled in the art, without departing from the spirit of the invention as claimed.

Having thus described our invention, what we claim and desire to secure by Letters Patent is:

1. A carrier for photographic plates adapted to be carried within a photographic loading device which includes a frame with relation to which a photographic plate may be temporarily associated, a cover carried by the frame and adapted to prevent passage of light to the photographic plate, and which may be withdrawn to permit the plate to become disassociated from the frame.

2. A carrier for photographic plates and the like adapted to be carried within a photographic loading device, which comprises a frame having a recess in one side thereof to receive a photographic plate, a flexible light proof element carried by the frame and adapted to temporarily cover the plate to prevent the access of light thereto, and whereby the removal of said light proof element will release the photographic plate from its position within the recess of said frame.

3. A carrier for photographic plates and the like, which comprises a frame having a recess in one side thereof to receive a photographic plate, a flexible light proof element carried by the frame and adapted to temporarily cover the plate to prevent the access of light thereto, and whereby the removal of said light proof element will release the photographic plate from its position within the recess of said frame, said light proof element being a plurality of folds of flexible material which when drawn from their folded position will uncover and release the photographic plate from its seated position within the recess of the frame.

4. A loading device for photographic apparatus, said device being adapted to receive a photographic plate and a carrier within which it is sealed against the entry of light, means for receiving the carrier within the loading device and for permitting it to be operated from the exterior thereof to release the photographic plate while within the holding device, said loading device being formed with a passageway into which the photographic plate is released from the carrier and along which the photographic plate may pass to be introduced into photographic apparatus.

5. In combination with a carrier for photographic plates, a loading device comprising a saddle adapted to be placed against the face of the film magazine, a body member extending from said saddle, the body member having an upper wall and a lower wall spaced from each other to form a slotted passageway extending through the saddle and which passageway may be brought to register with a complementary passageway in the film magazine, an opening being formed in the top wall of said body member and through which a photographic plate may pass, a hinged cover carried by the structure and adapted to swing downwardly to a position flat against the upper face of said body member, said cover being formed with a recess into which a photographic plate carrying device may be positioned and whereby when the photographic plate is released from the carrier it will pass through the opening in the upper wall of the body member and into the slotted passageway therebeneath to be delivered through the saddle to the film magazine.

6. A loading device adapted to receive a photographic plate and a carrier therefor, said device comprising a saddle member adapted to fit against a face of a photographic device into which a photographic plate is to be introduced, a body member associated with said saddle and having a floor and an upper wall in spaced parallel relation thereto whereby a passageway will occur between the upper wall and the floor and communicate with a slotted opening through the saddle, an opening through the said upper wall and through which a photographic plate may pass, a hinged cover pivoted with relation to the body member and having a recess in its under face providing a receiving space for a film plate carrier when the hinged cover is folded down upon the upper wall of the body member, and flanges formed at the opposite sides of the body member and between which the hinged cover fits when in a closed position.

7. A carrier for a photographic plate which includes a frame having a recess therein to loosely hold a photographic plate, a light-proof element normally closing said recess to retain the plate within the carrier, and from which the plate may pass when the cover is withdrawn.

8. In combination with the photographic loading device, a carrier comprising a frame having a recess in one side thereof to receive a photographic plate, a cover for said recess carried by the frame and adapted to prevent passage of light to the photographic plate, said cover when withdrawn, acting to release said plate from its carrier to a position within said photographic loading device.

9. A photographic loading apparatus, a carrier for photographic plates, adapted to be positioned within said photographic loading apparatus, said carrier comprising a frame, having a recess in one side thereof to receive a photographic plate, a flexible light-proof element carried by the frame to temporarily cover the plate and prevent the access of light thereto, and whereby upon removal of said light-proof element from its closing position, the photographic plate will be released from within the recess to discharge it into said loading apparatus.

10. A photographic loading apparatus, a photographic plate carrier adapted to be positioned within said loading apparatus, said carrier including a frame with relation to which a photographic plate may be temporarily associated, a cover carried by the frame and adapted to prevent passage of light to the photographic plate, said cover when withdrawn from said carrier, acting to permit the plate to become disassociated from the frame and to move to a position within the said loading means.

11. A carrier for photographic plates and the like, comprising a frame having a compartment therein to receive a photographic plate, and from which compartment it may be discharged through a discharge opening of a flexible light-proof element folded to close and seal said discharge opening and whereby upon removal of said light-proof element the photographic plate will be released from its position within the compartment of said frame.

JOHN C. HEWITT, JR.
V. EDWARD KUSTER.